June 22, 1965  F. FARNER  3,191,173
FREQUENCY DIVERSITY RADAR WITH "AND" CIRCUIT SIGNAL SELECTION
Filed Aug. 21, 1962

INVENTOR
FRANK FARNER
BY: McGlew and Toren
ATTORNEYS

United States Patent Office 3,191,173
Patented June 22, 1965

3,191,173
FREQUENCY DIVERSITY RADAR WITH "AND"
CIRCUIT SIGNAL SELECTION
Frank Farner, Zurich, Switzerland, assignor to Albiswerk
Zürich A.G., Zurich, Switzerland
Filed Aug. 21, 1962, Ser. No. 218,315
Claims priority, application Switzerland, Sept. 6, 1961,
10,351/61
3 Claims. (Cl. 343—17.1)

This invention relates to radar apparatus of the frequency diverter type and, more particularly, to such type of apparatus in which an "and" circuit is used for selection of the signal having the smaller amplitude.

In order to reduce the effects of jamming of radar apparatus by impulse modulated high frequency waves, radar devices have been developed which transmit two modulated high frequency waves at different frequencies but with the same impulse sequence. The impulse reflected from the target by both transmitted waves reach the receiver simultaneously and with the same intensity. The respective frequencies of the two waves are spaced sufficiently widely apart, or differ sufficiently from each other, that a jamming transmitter is not capable of jamming or disturbing both receivers or reflected waves at the same time. Consequently, any disturbance, noise or jamming is added to only one of the waves so that the reflected signal thereof is magnified. This affords a means whereby the existence of disturbing or jamming can be determined. However, the locating and identifying information with respect to the object toward which the two waves are directed can be calculated in known manner by using the signal with the smaller amplitude.

In known frequency diversity radar apparatus, the two reflected signals reach a decoupling network which directs the signals through respective filtering and mixing units where the signals are modulated with a local frequency to provide two intermediate frequencies, each corresponding to one of the two signals. The intermediate frequency signals are suitably amplified and rectified and, at their further amplification, are directed to a correlator which passes only the smaller of the two reflector signals to an indicating means. This correlator, through cooperation with an automatic regulator circuit, provides a control voltage for the intermediate frequency amplifiers.

In known arrangements of this type, the correlator comprises a multi-grid tube in which the two reflected signals are multiplied. The product of such multiplication is influenced by a jamming or disturbance signal in one of the channels. Additionally, the arrangement is sensitive with respect to adjustment of the working points and of the tube characteristics.

The present invention is directed to a frequency diversity radar in which the above-mentioned disadvantages of the correlator presently used are obviated by utilizing an "and" circuit to select the signal with the smaller amplitude.

For an understanding of the principles of the invention, reference is made to the following description of a typical embodiment thereof as illustrated in the accompanying drawings.

Figure 1:
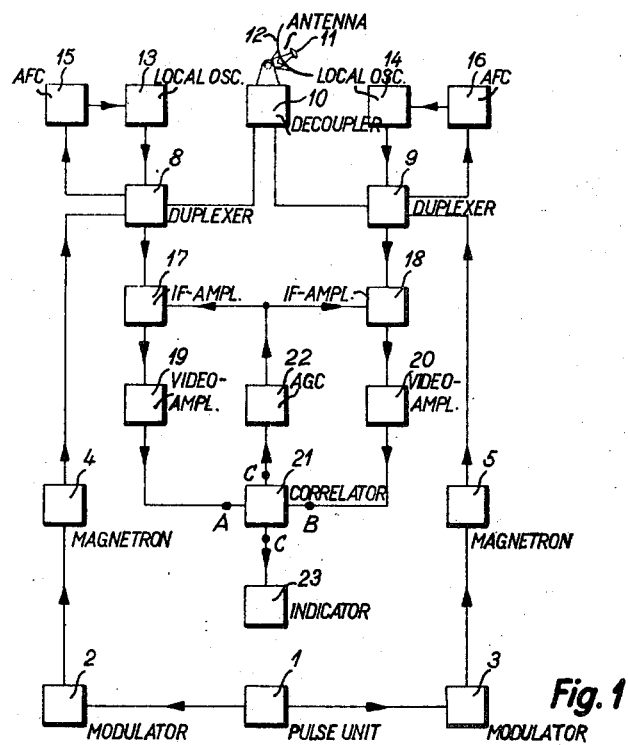
FIG. 1 is a schematic block diagram of a known frequency radar.

Referring to FIG. 1, an impulse unit 1 controls respective modulators 2 and 3 which deliver impulse programs of the same nature to respective magnetrons 4 and 5. The two high frequency signals, one each from a magnetron 4 and a magnetron 5, are fed through microwave duplexers 8 and 9 and a decoupling network 10 to a primary radiator 11 from where the signals are radiated by a reflector 12.

The reflected signals, traveling in the reverse direction, enter the network 10 and are directed to the microwave duplexer sections 8 and 9 which also contain mixing sections. Respective local oscillators 13 and 14 generate a frequency which is maintained constant by respective automatic frequency adjusting members 15 and 16. The intermediate frequency signals thus resulting are amplified in the intermediate frequency amplifiers 17 and 18 and also rectified therein. The respective signals are then further amplified in video signal amplifiers 19 and 20 and are directed to a correlator 21. The latter transmits only the smaller amplitude one of the two reflected signals to an indicator device indicated at 23. The correlator signal further produces, in an automatic amplifier regulator circuit 22, a control voltage for controlling the intermediate frequency amplifiers 19 and 20.

Figure 2:
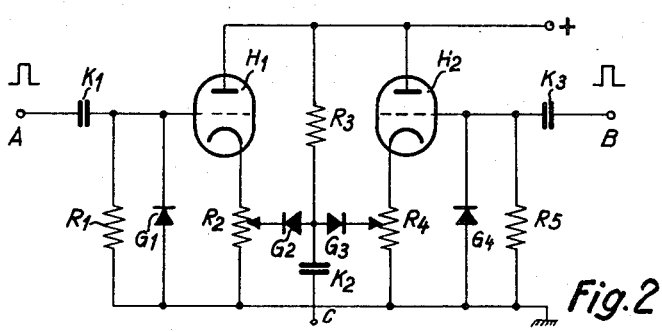
FIG. 2 is a schematic wiring diagram of a correlator, for use with the block diagram of FIG. 1, embodying the invention.

In accordance with the invention, the correlator 21, which is of the known type, is replaced by the correlator circuitry shown in FIG. 2. It will be noted that correlator 21, of FIG. 1, has input terminals A and B for the respective amplified intermediate frequency signals, and an output terminal C. The same terminals are designated in FIG. 2.

Referring to FIG. 2, the respective positive reflected signals at the input terminals A and B are applied, through respective coupling condensers $K_1$ and $K_3$, to the grids of respective amplifier tubes $H_1$ and $H_2$. The reflected signals can be derived, with adjustable amplitude, at the respective cathode resistances $R_2$ and $R_4$. Diodes $G_2$ and $G_3$, together with the resistance $R_3$, form an "and" circuit. The potential at the junction point of the diodes $G_2$ and $G_3$ is a function of the resistor $R_3$, and is of such value that only the smaller of the two signals is directed, through a condenser $K_2$, to the output terminal C.

Resistances $R_1$ and $R_5$ are the grid conducting resistances for the respective amplifying tubes $H_1$ and $H_2$. Clamping diodes $G_1$ and $G_5$ prevent negative pulses from being applied to the amplifier tubes $H_1$ and $H_2$.

While a specific embodiment of the invention has been shown and described in detail to illustrate the application of the principles of the invention, it will be understood that the invention may be embodied otherwise without departing from such principles.

What is claimed is:

1. In a frequency diversity radar in which a pair of video frequency signals, each corresponding to a respective one of a pair of reflected impulse modulated high frequency waves having widely spaced respective frequencies, are fed to the inputs of a correlator which derives, at its output, the signal having the smaller amplitude; the improvement comprising a pair of independent amplifier valves; means for applying each of the two video frequencies to the input of a respective valve, the two video frequencies being so applied substantially simultaneously; and an "and" circuit connected to the outputs of said valves and to an output terminal, said "and" circuit deriving the signal having the lesser amplitude and supplying it to said output terminal.

2. The improvement in a frequency diversity radar, as claimed in claim 1, including a pair of cathode resistors, each associated with a cathode of a respective amplifier valve; said "and" circuit including means for deriving said smaller amplitude signal from said cathode resistors.

3. The improvement in a frequency diversity radar, as claimed in claim 2, in which said "and" circuit comprises a pair of diodes, each connected to a respective one of said cathode resistors; and a third resistor connected between the common junction of said diodes and a common junction of the anodes of said amplifier valves.

References Cited by the Examiner
UNITED STATES PATENTS

| | | | |
|---|---|---|---|
| 2,682,048 | 4/45 | Longacre | 343—17.1 |
| 2,890,335 | 6/59 | Gibson | 328—115 |
| 2,978,645 | 4/61 | Tedford | 328—115 XR |
| 3,017,630 | 1/62 | Begovich et al. | 343—17.1 |
| 3,082,418 | 3/63 | Milosevic | 343—17.1 |

CHESTER L. JUSTUS, *Primary Examiner.*